United States Patent [19]
Bakoglu et al.

[11] Patent Number: 5,632,681
[45] Date of Patent: May 27, 1997

[54] UNIVERSAL ELECTRONIC VIDEO GAME RENTING/DISTRIBUTING SYSTEM

[75] Inventors: Halil B. Bakoglu, Ossining; Inching Chen, Wappingers Falls; Andy G. Lean, Merrick; Kiyoshi Maruyama, Chappaqua; Chung-wai Yue, Yorktown Heights, all of N.Y.

[73] Assignee: International Business Machines Corporation, Armonk, N.Y.

[21] Appl. No.: 401,484

[22] Filed: Mar. 7, 1995

[51] Int. Cl.$^6$ ............................................. A63F 9/24
[52] U.S. Cl. .............................. 463/44; 463/43; 463/42; 463/40; 463/25; 455/4.2; 455/5.1; 455/6.2; 455/6.3; 364/410; 364/479.04; 364/DIG. 1; 379/90; 348/7; 348/12; 348/13; 348/552; 340/323 R
[58] Field of Search ...................... 463/24–25, 29–31, 463/40–45; 455/2, 4.1–6.3, 32.1; 364/130, 141, 146, 410, 479, DIG. 1; 348/3, 7, 10, 12–13, 552; 340/323 R; 379/90, 102, 91, 104–105, 111–114, 140; 395/400, 425, 650

[56] References Cited

U.S. PATENT DOCUMENTS

| 4,398,189 | 8/1983 | Pasierb, Jr. et al. | 463/33 |
|---|---|---|---|
| 4,498,079 | 2/1985 | Ghosh et al. | 463/33 |
| 4,567,512 | 1/1986 | Abraham | 455/4.2 |
| 4,569,026 | 2/1986 | Best | 364/410 |
| 4,590,516 | 5/1986 | Abraham | 455/5.1 |
| 4,593,376 | 6/1986 | Volk | 463/44 |
| 4,829,372 | 5/1989 | McCalley et al. | 348/7 |
| 4,849,817 | 7/1989 | Short | 348/385 |
| 5,051,822 | 9/1991 | Rhoades | 463/40 |
| 5,113,518 | 5/1992 | Durst, Jr. et al. | 364/DIG. 1 |
| 5,166,886 | 11/1992 | Molnar et al. | 364/479 |
| 5,181,107 | 1/1993 | Rhoades | 455/4.2 |
| 5,251,909 | 10/1993 | Reed et al. | 463/43 |
| 5,347,304 | 9/1994 | Moura et al. | 455/5.1 |
| 5,350,176 | 9/1994 | Hochstein et al. | 463/42 |
| 5,497,479 | 3/1996 | Hornbuckle | 364/410 |

*Primary Examiner*—Jessica Harrison
*Assistant Examiner*—Mark Sager
*Attorney, Agent, or Firm*—Douglas W. Cameron

[57] ABSTRACT

A video game cartridge that can be plugged into a video game machine to enable a user to request and play a video game for a predetermined number of video frames. The cartridge has a receiver for receiving the video game program and the predetermined frame count in response to a request from the user. The program and frame count is then stored in a memory of the cartridge. Finally, the cartridge has a counter which changes its value when the user is actively playing the video game program. The counter ceases to change its value when the user is not playing the video game program. When the counter reaches a predetermined limit, the user is no longer authorized to play the video game program.

11 Claims, 2 Drawing Sheets

UNIVERSAL ELECTRONIC VIDEO GAME RENTING/DISTRIBUTING SYSTEM

TECHNICAL FIELD

This invention relates to a video game cartridge for receiving video game programs from a remote server.

DESCRIPTION OF THE PRIOR ART

Today, there are many video games available for purchase or for rental at stores. Generally, there is no trial or test playing of the games in the stores, and there is no return on purchased games once the game package has been opened. Therefore, a person who is interested in any game has to buy it before playing it and thus may face the risk of not liking the game later. There is no return or refund of the game since the package has been opened. A person who rents a game from a store has to go through the usual VCR tape rental trouble of driving to the store, picking up the game and then later returning the game to the store.

To make video game rental easier for the consumer, Sega has created the Sega Channel. In this service, via cable and using a cable adapter unit which is plugged into the Sega Genesis game machine, people can play games that are downloaded to the cable adapter. It requires the on-line Sega Channel connection as well as the special adapter while the game is being played.

Down loading a software program to a personal computer over the modem connection exists today. Such software can come with a limited life where the life can be specified by expiration date, or time, or the number of times of the software usage. These schemes in limiting the software usage is not applicable to down loading video games to cartridges which are plugged into existing video game base units because these game base units do not have timer device built in. Thus a new scheme for controlling the usage of the game is needed.

The U.S. Pat. No. 4,905,280 to J. D. Wiedemer, et al describes a method for real time down loading of broadcast programs for pay-per-view or for subscription.

Descrambling of broadcast programs is done by codes on a replaceable memory module, which is delivered to a subscriber by the service provider. This patent is applicable to the "purchase" of software content or real-time service, but it is not applicable to limiting the life of rented software.

U.S. Pat. No. 5,251,909 to Reed et al describes software renting or distributing schemes in which access is granted to a subscriber prior to the actual programs being transmitted. This patent describes an off-line process and is not applicable to delivering software for rental purposes.

SUMMARY OF THE INVENTION

It is an object of this invention to provide a portable video game cartridge which can be plugged into a video game machine base unit, such as Nintendos, Sega Genesis™ video game machine or Atari's Jaguar™ video game machine. The cartridge will allow a video game program to be used by receiving the video program over a telephone network or cable system.

The current invention describes a way of distributing and controlling the usage of a video game program (or any software program) by using a "watchdog mechanism" and by limiting the "life" of a game by limiting the total number of graphic frames that a video machine can generate. It offers a simple and effective way of software renting and distribution where game machines have no timer.

It is also an object of this invention to prevent piracy of video programs and programs in general by storing the frame count in a random location of the memory that is unknown to a potential pirate, especially if the count itself is encrypted. Since the count is part of the video game program or program execution path, the video game or program cannot be used without knowledge of the count.

This invention is generally an apparatus and method for enabling a user to request and use a program where the user receives the program and a frame count indicating the number of frames of the program that the user is authorized to execute or use. This program and the frame count is then stored in a memory. When the user is actively providing input to the program, the frame count changes. The frame count will cease to change when the user is not providing input to the program. When the count reaches a predetermined limit, the user is prevented from continuing use of the program.

This invention is a video game cartridge which can be plugged into a video game machine for enabling a user to receive and play a video game for a predetermined number of frames. The cartridge has a receiver for receiving the video program and for receiving a frame count indicating the number of video frames of the video game program that the user is authorized to play. The video program and frame count is then stored in a memory of the cartridge. The cartridge also has a counter which changes the frame count when the user is actively playing the video game program. When the user is not playing the video game program, the counter ceases to change its count. Finally when the counter reaches a predetermined limit, the user is prevented from further playing the video game program.

DESCRIPTION OF THE PREFERRED EMBODIMENT

Figure 1:
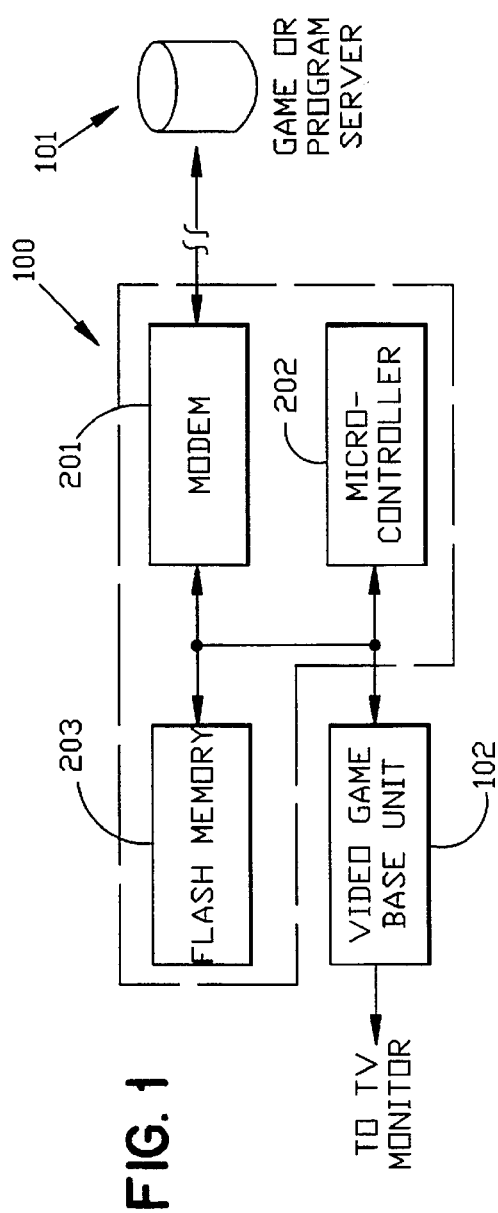
FIG. 1 schematically illustrates the major components of the video game cartridge along with a video game machine and a remote server.

FIG. 1 illustrates a sample diagram of a electronic game or program renting system setup. The dotted line encloses the portable and programmable game cartridge unit 100 that can be plugged into a video game machine base unit 102, such as Sega Genesis™ video game machine, and remotely be connected to a video game server 101 via a modem connection. The connection to the remote video server can be through cable TV, or other telecommunication facilities.

When a video game base unit 102 is powered on, a user could either play a game (or games) stored in the programmable game cartridge 100 or place an order of a new game (either for rental or for purchase) to the game or program server 101. The cartridge 100 contains screen assistance (and voice assistance) to help place an order for a video game program to the server 101.

Figure 2:
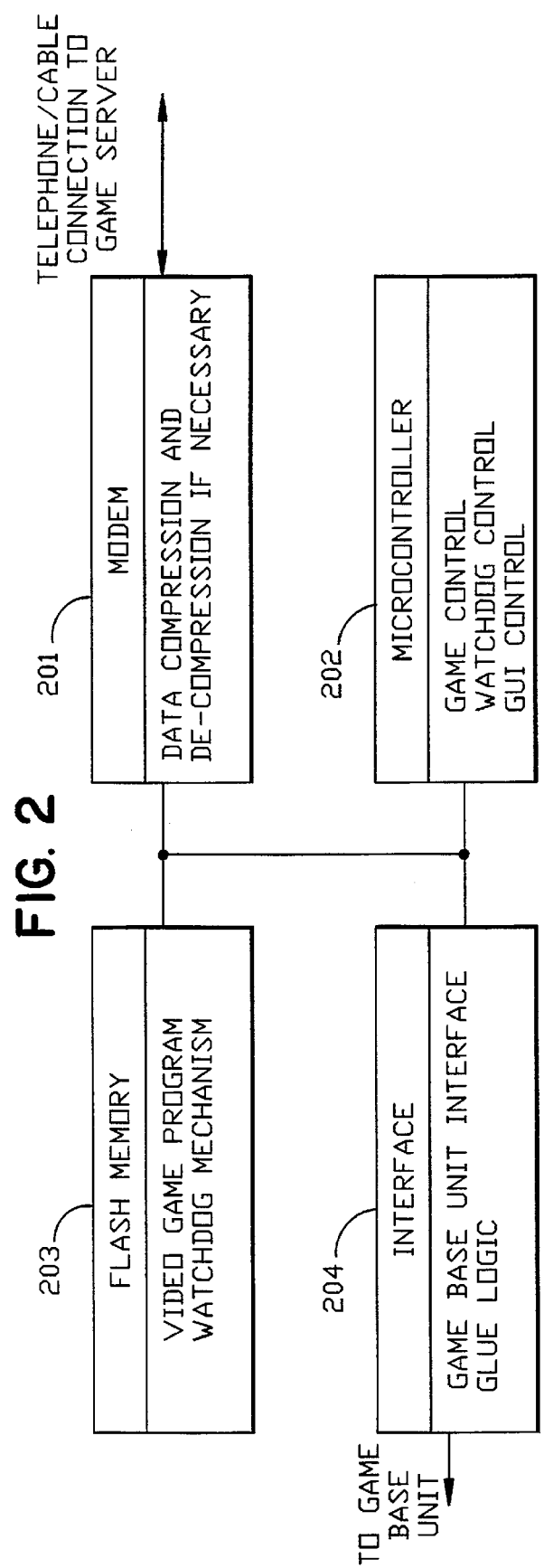
FIG. 2 is a functional diagram showing the functions of each of the major components of the video game cartridge.

FIG. 2 illustrates the components of the video game cartridge unit 100. It consists of modem 201, microcontroller 202, flash memory 203 and an interface 204 to the video game base unit 102. The modem 201 performs the interface to the telephone or cable network. It can optionally perform decompression of received game or software if necessary.

The received game is stored in flash memory 203. The game comes with its "life" which is indicated by the total number of graphic frames the video game machine 102 is authorized to generate when the game is actively played. For example, the game machine could render game graphics frame by frame at the rate of thirty framers per second.

After the number of graphic frames is exhausted, further playing of the game is prevented by the following mechanism. The flash memory 203 also stores a "watchdog mechanism" which keeps track of the remaining life of the game. An hourglass routine is embedded in the watchdog mechanism which is executed by microcontroller 202. This watchdog mechanism updates and tracks down a specified register in the flash memory 203 with its location randomly determined by the game server 101 in FIG. 1 during the down loading of the game.

The use of expiration date or time for voiding the game is an obvious approach if the video game base unit 102 comes with a timer. Since this patent application assumes a game base unit 102 which has no timer (which is the case of many existing game machines), the "life" of the rented game is determined by the total number of graphic frames that the base game unit can generate. This "life", or frame count, is what a renter gets when a game is down loaded. It is stored into a location in the flash memory 203. The location into which the frame count is stored in the flash memory is determined randomly by the video server at the time of the game down loading. The video game can resume at any time when it is being turned on, provided there is available frame count stored in the designated random location. The microcontroller 202 can pick up the frame count and allow the renting period, and thus the game or software, to be continued. As the rented game is being played, the frame count is decremented. When the user turns off the power, the hourglass routine in memory 203 will first store the remaining frame count to a random location in the non-volatile memory 203 and then shut down the game. The rental expires when there is no frame count remaining. The microcontroller 202 will not allow any portion of the game to be played by the game base unit 102 when the frame count reaches zero.

Figure 3:
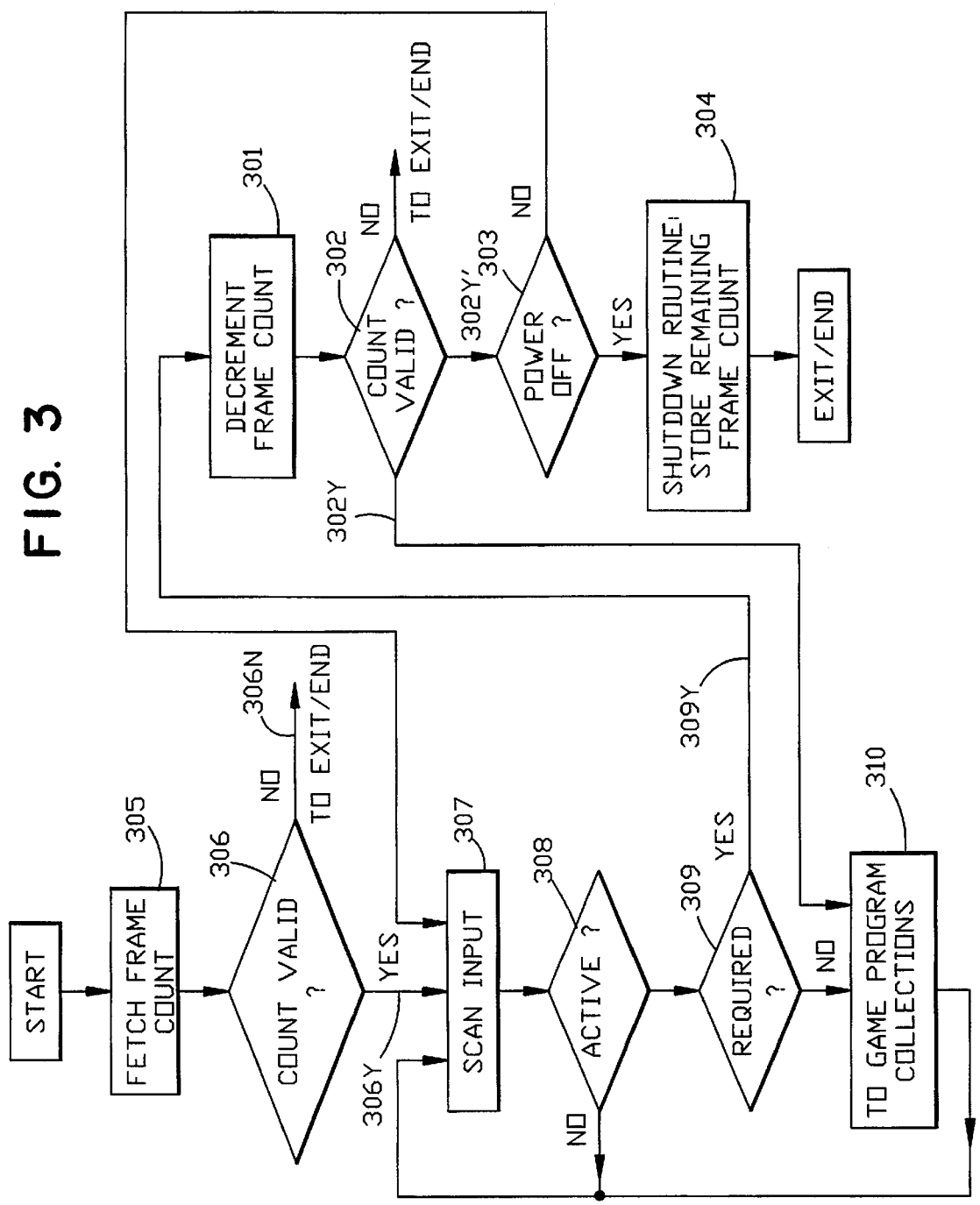
FIG. 3 schematically illustrates the flow chart for the watch "dog mechanism".

FIG. 3 illustrates the watchdog mechanism embedded with the video game program execution path that contains the hourglass routine which serves as part of the watchdog mechanism which can expire the game. When the user starts the game, the frame count is first fetched (305) and checked (306). If the frame count reaches zero, the game is over even though the game unit still has its power on (306N). If the frame count is still greater than zero (306Y), the scanner continues to monitor the game player's input in playing the video game (307). No active input (307) means the player is not playing the video game, and the scanner continues to monitor the player inputs from the key pad connected to the video game. When there is no active input, the video game will not render any game graphic frames. Therefore, the game program execution path will fall through decisions 308 and 309 and immediately return to continue scanning (307). When the game is not actively played and the player leaves the game machine's power on, the game will be sitting idle without rendering any new graphic frames. The frame count will not be consumed until the player becomes active again in playing the game as detected by the scanner (307 and 308).

If the player's input has been detected as active (307), a check is made to see if graphic rendering is required (309). Graphics rendering is required when the game program determines that the input signals from the key pad connected to the video game are valid signals. If rendering is required (309Y), the frame counter will be decremented (301). The hourglass routine (301 and 302) decrements the frame count and checks for any frame count left.

If the count is valid (302Y), then the program flows back to (310) which is the game program main collections, and then at the same time, 302 Y' branches to check for power-off condition (303).

If the user decides to power-off the game, the watchdog mechanism will go through decision (303) and the shutdown routine (304) to store any remaining frame count in the flash memory. The shutdown routine stores the remaining frame count in the flash memory and exits the game. In summary flowchart components (301–306) and their associated flash memory form the "watchdog mechanism" that contains the hourglass routine (301 and 302) to keep track of the games "life" (remaining frame count). The watchdog mechanism also insures that the game can be resumed if there is still a valid frame count in the flash memory. Microcontroller (202) can also give advance warning when the rental is about to expire. Rental extension, if desired, can be downloaded again by the server (101) through a telephone or cable connection. Thus, server (101) in FIG. 1 has complete control over the game playing time, which should reflect the user's request for renting the game.

Although this embodiment was described in terms of a video game program in a cartridge, this invention can be extended to software programs in general. As long as the programs monitor user inputs, a scanner and watchdog mechanism can be implemented in similar fashion using a non-volatile memory.

The watchdog mechanism can even be made more secure by encrypting the frame count, which is stored at a random location in the memory. Even if the would-be pirate stumbles across the count in the memory, he/she wouldn't know what he/she found.

Having thus described our invention, what we claim as new and desire to secure by Letters Patents is:

1. An apparatus for enabling a user to request and use a program, said apparatus comprising:
   a. a receiver for receiving the program and a frame count indicating a number of frames of the program that is authorized for execution by the user;
   b. a memory for storing the program and the frame count received by the receiver; and
   c. a counter for changing the frame count when the user is actively providing input to the program, wherein the counter ceases to change the count when the user is not providing input to the program, and wherein the user is prevented from continuing use of the program when the counter reaches a predetermined limit.

2. An apparatus as recited in claim 1, further comprising:
   means for randomly determining an address in the memory in which the frame count is stored, and wherein the address is unknown to the user.

3. A method of enabling a user to request and use a program, said method comprising:
   a. receiving the game program and a frame count indicating a number of frames of the program that is authorized for use by the user in response to a request;
   b. a memory for storing the program and the frame count; and
   c. changing the frame count when the user is actively using the program, wherein the frame count ceases to change when the user is not using the program and wherein the user is prevented from continuing use of the program when the counter reaches a predetermined limit.

4. A method as recited in claim 3, wherein the frame count is stored in a randomly determined location in the memory.

5. A video game cartridge which is plugged into, for operation with, a video game machine to enable a user to request and play a video game program which is received from a remotely located server, said video game cartridge comprising:
   a. a receiver for receiving from the server the video game program and a frame count indicating a number of frames of the video game program that is authorized for play by the user in response to a request;
   b. a memory for storing the video game program and the frame count received by the receiver; and
   c. a counter for changing the frame count when the user is actively playing the video game program, wherein the counter ceases to change the count when the user is not playing the video game program, and wherein the user is prevented from further playing the video game program when the counter reaches a predetermined limit, indicating that the user has played said video game for the number of frames.

6. A video game cartridge as recited in claim 5, further comprising:
   means for randomly determining an address in the memory in which the frame count is stored.

7. A video game cartridge as recited in claim 5, further comprising:
   a modem for transmitting to the server the request from the user to play a video game program.

8. A video game cartridge, as recited in claim 5, wherein said memory is a non-volatile memory.

9. A video game cartridge, as recited in claim 8, wherein the frame count indicated in the counter is stored in the memory when power for the video game machine is turned off.

10. A video game cartridge, as recited in claim 9, further comprising:
    a means for retrieving the frame count stored in the memory when power for said game machine is turned on.

11. A video game cartridge which is plugged into, for operation with, a video game machine to enable a user to request and play a video game program which is received from a remotely located server, said video game cartridge comprising:
    a. a modem for transmitting from the user over a telephone or cable network a request to receive the video game from the server, and for receiving the video game program and frame count from the server over the telephone or cable network, the frame count indicating a predetermined number of frames of the video game program that is authorized for play by the user in response to the request;
    b. a non-volatile memory for storing the video game program and the frame count;
    c. a counter for changing the frame count when the player is actively playing the video game;
    d. a means for storing the changed frame count of the counter in the memory when the power to the video game machine is turned off; and
    e. a means for retrieving the changed frame count stored in the memory when the player resumes playing the video game, wherein the user is prevented from further playing of the video game program when the frame count of the counter reaches a predetermined limit, indicating that the user has played said video game for the predetermined number of frames.

* * * * *